3,520,654
PROCESS FOR THE PREPARATION OF LOW DENSITY ALUMINA GEL

Brownell Carr, Cincinnati, Ohio, Frank G. Ciapetta, Silver Spring, Md., and Charles P. Wilson, Jr., Cincinnati, Ohio, assignors to W. R. Grace & Co., New York, N.Y., a corporation of Connecticut
No Drawing. Continuation-in-part of applications Ser. No. 310,848, Sept. 23, 1963, Ser. No. 328,457, Dec. 6, 1963, and Ser. No. 378,454, June 26, 1964. This application May 1, 1967, Ser. No. 634,919
Int. Cl. C01f 7/34
U.S. Cl. 23—143       2 Claims

ABSTRACT OF THE DISCLOSURE

A process for preparing the alumina gels having high porosity and low density by reducing the pH of a soluble aluminum salt solution to 4.5–7, spray drying and washing the alumina gel product.

---

This application is a continuation-in-part of one or more of the following now abandoned applications: Ser. No. 310,848, filed Sept. 23, 1963, Ser. No. 328,457, filed Dec. 6, 1963, Ser. No. 378,454, filed June 26, 1964.

Hydrous alumina or alumina gel is generally formed by adding ammonia or some other alkaline material to a solution of a suitable salt, such as aluminum sulfate. The precipitate is very voluminous and gelatinous. The gel often contains as little as 10% alumina, the balance being water. In this form, it is the most reactive of the hydrous aluminas and contains both acids and alkalis. The gel can be dried to a hard, glass-like material and activated by heating. It has a high surface area which makes it useful as an adsorbent, a catalyst or catalyst support.

Prior to our discovery that alumina gels having abnormally low density show great advantage over hydrous alumina gels in many applications such as supports for certain catalysts, such alumina gels were viewed with disfavor because of their relatively soft character when compared to the harder high density alumina gels. In addition to the use of these gels as supports for catalysts used in the purification of internal combustion engine exhaust gases, the gels also have utility as supports for other types of catalyst such as, for example, bases for reforming, hydrocracking, and/or hydrotreating catalysts.

We have found that alumina gels having high porosity, high surface area and low compacted density can be prepared by adjusting the pH of a soluble aluminum salt solution to pH in the range of 4.5 to 7, spray drying the slurry, washing, drying and recovering the product. The pH in each case is maintained only high enough to avoid the presence of soluble alumina. In addition, when certain aluminum salts are used the porosity can be increased by the addition of other soluble alkali metal salts, preferably sodium salts.

The essence of this invention resides in the maintenance of the pH of the slurry of the spray dried product in the range of 4.5 to 7. When the conditions are controlled to maintain the pH in the proper range, the product recovered has low density and a high mercury pore volume.

Our novel process can utilize any one of three embodiments. In the first embodiment, the pH is adjusted by rapidly adding an aluminum salt solution to an alkali metal aluminate solution with vigorous stirring.

In an alternate procedure, the product may be recovered by adding a solution of an alkali metal aluminate to a soluble aluminum salt solution. In this process, the pore volume of the product can be altered by adding certain soluble salts, preferably alkali metal salts to the aluminum salt solution.

In the third embodiment, the alumina is prepared by the addition of a solution of sodium carbonate to an aluminum salt solution. In this embodiment the pore volume properties may also be improved by the addition of a neutral alkali metal salt solution, preferably sodium salt solution.

In each of these embodiments, the pH of the mixed hydrous alumina slurry is maintained in the range of 4.5 to 7 so that it is sufficiently high to avoid the presence of soluble alumina. Maintaining the pH in the proper range also facilitates the subsequent removal of the alkali metal ions in the washing step. After the mixing step, the product is spray dried as a slurry without prior filtration or purification.

In order to obtain the required product porosity and density, the most desirable $Na_2O/Al_2O_3$ weight ratio and to recover a product of the proper chemical composition, an excess of sodium salts or acids may be added to the aluminum salt solution prior to the addition of the sodium aluminate in the second embodiment or sodium carbonate in the third embodiment.

In each of these embodiments, an aluminum salt solution is used as one of the reactants. Although aluminum sulfate is the preferred salt, other salts, such as the chlorides and nitrates, may also be used. In the second and third embodiments, the sulfate, chloride or nitrate ion to prepare the sodium salts may be added as an acid, i.e. sulfuric acid, hydrochloric acid or nitric acid.

Each of these embodiments uses an aluminum salt solution. This solution is prepared to contain 65 to 100 grams per liter of aluminum oxide.

In the first and second embodiments of this invention, an alkali metal aluminate, preferably sodium aluminate, is used. The sodium aluminate solution is prepared to contain 65 to 100 grams per liter of aluminum oxide and corresponding amounts of sodium oxide. When sulfuric acid solution is used in any of the embodiments, it is added as a solution in the range of 20 to 50 weight percent sulfuric acid.

The third embodiment of our invention uses sodium carbonate. The sodium carbonate may be added as a solution in the range of about 5 to 15 percent, preferably about 9 percent.

Our novel product is prepared by spray drying the slurry prior to washing. Spray drying may be accomplished by spraying the composition through a nozzle or off a spray wheel into contact with hot gases. The spray drying may be accomplished by any suitable spray drier, operated at gas inlet temperatures up to 1300° F. The temperature of the drying gases entering the spray drying chamber are preferably controlled within the range of about 400 to 1000° F., so that the aluminous slurry is converted into microspheroidal gel particles. Spray drying usually results in a moisture content of from 7 to 20 percent. The alumina gel is normally spray dried without prior removal of salts, such as sodium sulfate, to lower the density and at the same time increase the porosity of the purified, spray dried alumina gel product.

In addition to the other characteristics, our product has a low sodium oxide content. The sodium oxide content of the alumina gel is important in several applications. When these gels are used as supports for catalysts in various applications, they are frequently subjected to relatively high temperatures. When the gels are used as supports for catalysts for converting the emissions from an internal combustion engine to innocuous entities, for example, the temperatures frequently reach levels in excess of 1000° F. An appreciable sodium oxide content cannot be tolerated under these conditions because sodium oxide tends to close the pores by fusion. The effect is similar to the effect noted when cracking catalysts contain excessive amounts of sodium oxide.

For these reasons, the sodium oxide content of the alumina gel suitable for use as described must be limited to a content of about 0.05 weight percent expressed as $Na_2O$.

The conditions for preparing the alumina gels are adjusted to provide a product with a mercury pore volume in the range of 1.5 to 3.5 cc./g., preferably about 1.7 to 3.0 cc./g. The nitrogen pore volume of the product recovered from our novel process is 0.60 to 1.3 cc./g., preferably 0.7 to 0.90 cc./g.

The compacted density of the product recovered from the process of the instant application is 14 to 25 pounds per cubic foot, preferably 16 to 22 pounds per cubic foot. The process conditions are controlled so that the pH of a slurry of the spray dried product is in the range of 4.5 to 7.0, preferably 4.7 to 6.0.

The pore volume may be determined in one of two ways. "Nitrogen pore volume" is measured by the techniques described in the article by S. Brunauer, P. Emmett, and E. Teller, J. Am. Chem. Soc., 60,309 (1938). This method depends on the condensation of nitrogen into the pores, and is effective for measuring pores with pore diameters in the range of 10 to 600 angstrom units.

"Mercury" pore volume is obtained by forcing mercury into the pores. The measurement of mercury pore volume was accomplished using a standard mercury porosimeter. Operation of this system is dependent on the fact that mercury can be forced into different sized pores depending on the pressure exerted. Thus, at 100 p.s.i. absolute pressure, mercury can be forced into pores having a diameter above about 17,500 angstroms. As the size of the pores decrease, the amount of pressure required to force mercury into the pores increases. This method is described in detail in the publication of Ritter, H. L. and Drake, L.S., Ind. Eng. Chem. Anal. Ed., 17,787 (1945).

After spray drying, the product is washed with a suitable solvent to remove the sodium and sulfate to suitably low levels. Good results are obtained with washes of water that are passed through a cation exchange resin to remove the cations and the pH adjusted to the proper range. These washes are then followed by a wash with ammonium sulfate solution. The ammonium sulfate washes are preferably carried out using a 2° Baumé ammonium sulfate solution. After the wash with the ammonium sulfate solution, it is preferable to wash the alumina with decationized water adjusted to a pH of about 8.3 to 9.5 with ammonia.

The compacted density of the products of the examples was determined by heating the washed and dried product for three hours at 1000° F. After cooling, 100 grams of the product was transferred to a 250 ml. cylinder and compacted (using a conventional Ro-Tap machine) for 30 minutes. The volume was then measured and the compacted density calculated by using the formula $D = M/V$ where M represents the weight of the sample and V is the volume after compacting.

Our invention is further illustrated by the following specific but non-limiting examples.

EXAMPLE I

In this example an alumina gel was produced by slow addition of aluminate to acid; it had a mercury pore volume of 1.44 cc./g. and a compacted density of 25.6 pounds per cubic foot.

In this run, a sodium aluminate solution was prepared containing 12.2% $Na_2O$ and 8.4% $Al_2O_3$ by dissolving 19 pounds of alumina trihydrate $(Al_2O_3) \cdot 3H_2O$ in 61 pounds of 20% sodium hydroxide solution prepared by dissolving 12 pounds of sodium hydroxide in the proper amount of water. This aluminate solution had a mole ratio of $Na_2O/Al_2O_3$ of 2.4 to 1. After the hydrate had completely dissolved, the solution was diluted to 148 pounds with water.

A 20% solution of sulfuric acid was prepared and 99 pounds of the above sodium aluminate solution was added intermittantly to 111 pounds of the sulfuric acid solution over a period of 30 minutes. The pH at the end of this addition was 4.7. The hydrous alumina precipitated as a semi-gelatinous mass throughout the addition of the sodium aluminate to the acid.

The alumina slurry at a pH of 4.7 was directly spray dried without prior filtration. The slurry contained 3.95% $Al_2O_3$. The spray dried product has a total volatile content of 14.0% and a pH of 4.7.

The spray dried product was washed by reslurrying 800 grams of the product with 4 liters of 2° Baumé ammonium sulfate solution, heated to a temperature of 110° F. This slurry was stirred for 15 minutes and filtered. The pH of the slurry was 4.7. The slurry was washed five additional times with 2° Baumé ammonium sulfate solution, heated to a temperature of 110° F. After the completion of the sixth wash, the hydrous alumina was filtered and reslurried with the water that had been passed through a cation exchange resin and treated with ammonia to adjust the pH to 9.5. This ammoniated water rinse was repeated until a total of four rinses had been completed. The rinse with ammonia water was carried out at a temperature of 110° F. The filtered washed product was dried rapidly by spreading 150 grams of the washed alumina in a thin layer in a shallow (13" x 15" x 1") pan. The product was flash dried in this equipment. The physical and chemical data on this product is shown in Table I.

EXAMPLE II

In this example a lower density product was obtained by rapid co-mixing of aluminate and acid.

In this run, 99 pounds of the sodium aluminate solution, prepared as described in Example I, was co-mixed with 110 pounds of 20% sulfuric acid. The pH of the slurry was 4.7. This type of mixing resulted in the formation of a hydrous alumina that was more viscous and gelatinous than the product of Example I. This aluminous slurry was directly spray dried without prior filtration. The total volatiles of the spray dried product was 12.9% and the pH 4.7. The spray dried product was washed and dried using the techniques described in Example I. The physical and chemical properties of the product are summarized in Table I.

EXAMPLE III

In this example, the sulfuric acid solution was added slowly to the sodium aluminate solution to prepare a higher density alumina gel as in Example I.

A total of 110 pounds of 20% sulfuric acid solution was prepared. This solution was added to 108.5 pounds of sodium aluminate solution prepared using the technique described in Example I. The addition was made in increments over a period of about 30 minutes. The pH of the slurry was 4.7. Precipitation of the alumina was observed to occur throughout the addition of the acid to the sodium aluminate solution. This precipitation was more pronounced than occurred when the sodium aluminate was added to the sulfuric acid as in Example I. The aluminous slurry contained 4.2% $Al_2O_3$. This aluminous slurry was spray dried without prior filtration, washed and dried as described in Example I.

chemical properties of the product are summarized in Table I.

These data show a product with surface areas and pore volumes in the most desirable range can be prepared by the process as set out in the examples.

TABLE I

| Product of example | I | II | III | IV | V | VI |
|---|---|---|---|---|---|---|
| pH of slurry to spray drying | 4.7 | 4.7 | 4.7 | 4.7 | 4.7 | 4.7 |
| pH spray dried product | 4.7 | 4.7 | 4.7 | 4.7 | 4.7 | 4.7 |
| Chemical analysis of washed product in percent: | | | | | | |
| $Na_2O$ | 0.057 | 0.054 | 0.099 | 0.035 | 0.017 | 0.041 |
| $SO_4^-$ | 1.17 | 1.24 | 0.04 | 0.01 | 0.83 | 0.49 |
| Total volatiles after ½ hour at 1,750° F. in percent | 25.81 | 21.24 | 26.42 | 13.69 | 12.9 | 15.14 |
| Surface area in square meters per gram (after 3 hours at 1,000° F.) | 340 | 377 | 365 | 390 | 401 | 364 |
| Pore volumes in cubic centimeters per gram: | | | | | | |
| Nitrogen | 0.61 | 0.67 | 0.44 | 1.08 | 0.91 | 0.83 |
| Mercury | 1.44 | 1.96 | 1.18 | 3.21 | 2.53 | 2.74 |
| Compacted density in pounds per cubic foot | 25.6 | 18.2 | 30.9 | 14.0 | 15.5 | 15.6 |

EXAMPLE IV

In this example, the $Na_2O/Al_2O_3$ mole ratio of the sodium aluminate solution was changed to 1.57 to 1.

The sodium aluminate solution was prepared by dissolving 11.3 pounds of alumina trihydrate in a concentrated sodium hydroxide solution containing 9 pounds of flake sodium hydroxide. After the hydrate was dissolved in the hydroxide solution, the solution was diluted to 141.5 pounds with water. After this dilution, the aluminate solution contained 4.95% $Na_2O$ and 5.22% $Al_2O_3$.

The twenty-five pounds of the above sodium aluminate solution was rapidly co-mixed with aluminum sulfate solution prepared to contain 95 grams per liter of $Al_2O_3$. The pH of the co-mixed solutions was 4.7. This aluminous slurry was then directly spray dried without prior filtration. The spray dried product was washed and flash dried as described in Example I. The physical and chemical properties of the product are summarized in Table I.

EXAMPLE V

In this example, the concentration of the sodium aluminate solution was increased over that in Example IV from 5.2% $Al_2O_3$ to 11.35% $Al_2O_3$.

A sodium aluminate solution was prepared using the techniques described in Example IV. After the aluminate had dissolved in the sodium hydroxide, the solution was diluted to 65 pounds with water. This gave a sodium aluminate solution containing 10.7% $Na_2O$ and 11.4% $Al_2O_3$. Twenty-six pounds of the above sodium aluminate solution was rapidly co-mixed with 11.3 liters of an aluminum sulfate solution containing 95 grams per liter $Al_2O_3$ and no free acid. The mixing was controlled to yield an aluminous slurry having a pH of 4.7. The slurry was directly spray dried without prior filtration. This spray dried product was then washed and flash dried using the techniques described in Example I. The physical and chemical properties of the product of this example are set out in Table I.

EXAMPLE VI

In this example, a 5.2% $Al_2O_3$ sodium aluminate solution having an $Na_2O/Al_2O_3$ ratio of 1.57 to 1 was rapidly co-mixed with sulfuric acid instead of aluminum sulfate solution.

In this run, 100 pounds of sodium aluminate solution, prepared using the techniques described in Example IV, was rapidly co-mixed with 52.5 pounds of 20% sulfuric acid solution. The slurry had a pH of 4.7 and contained 3.4% $Al_2O_3$. The slurry was directly spray dried without prior filtration. The spray dried product was washed and dried as described in Example I. The physical and The data in Table I also emphasizes the importance of certain of the techniques in preparing this alumina. When the sulphuric acid was added slowly to the sodium aluminate, or vice versa, as in Examples I and III, a more dense and less porous material was obtained than when these solutions were co-mixed, as in Examples II, IV, V and VI.

Furthermore, co-mixing more dilute solutions gave higher pore volumes as shown by comparing Example IV with V and Example II with VI.

The salt removal techniques described in these examples are adequate as evidenced by the $Na_2O$ and sulphate content of these products.

EXAMPLE VII

Examples VII through X illustrate the preparation of the alumina by the second embodiment of the invention.

In this example an alumina gel was produced which had a mercury pore volume of about 1.84 cc./g. and a compacted density of 0.35 g./cc.

In this run, 10 gallons of aluminum sulfate solution was prepared to contain 7.67% $Al_2O_3$ (specific gravity of 1.3 at 60° F.). This solution was transferred into a mixing tank provided with heating, agitating means, and equipped with a centrifugal pump for circulation. The alum solution was heated to a temperature of 99° F. and sodium aluminate solution containing 7.81% $Al_2O_3$ and 6.94% $Na_2O$ (specific gravity 1.2) was added to the alum solution. The precipitation of the hydrous alumina occurred after 11 gallons of the sodium aluminate solution had been added. The pH of the mixture at this point was 4.45. Addition of the sodium aluminate solution was continued until 12.55 gallons had been added. The pH of the mixture was then 5.6 and the temperature of the slurry at this stage was 110° F. The slurry containing the precipitated hydrous alumina and salt impurities was then directly spray dried. The pH of the spray dried product when slurried with water was 5.6. The sodium and sulfate impurities were removed from the spray dried product by washing with 1° Bé. ammonium sulfate sodium adjusted to a pH of 5.6 and heated to a temperature of 130° F. This wash was followed by a wash in which the pH was adjusted 8.5 to 9.5 with ammonia and the temperature increased to 130° F. The product was finally flash dried. The physical and chemical data on this product is shown in Table II.

The compacted density of the product of this example and following examples was determined by heating the washed and dried product for three hours at 1000° F. After cooling, 100 grams of the product was transferred to a 250 ml. cylinder and compacted (using a conventional Ro-Tap machine) for 30 minutes. The volume was then measured and the compacted density calculated by using the formula $D=M/V$ where M represents the weight of the sample and V is the volume after compacting. The nitrogen and mercury pore volumes were determined on samples after activation for three hours at 1000° F.

EXAMPLE VIII

The manner in which the increase in pH of the spray dried product causes an increase in the sodium oxide content of the washed product was demonstrated in an example in which additional sodium aluminate was added in the preparation of the product.

In this run, the product was prepared as in Example VII. Ten gallons of aluminum sulfate solution containing 7.67% $Al_2O_3$ was poured into the equipment described in Example I. The sodium aluminate solution was added until a total of 13.2 gallons was added to 10 gallons of the auminum sulfate solution. The pH of the slurry containing the precipitated hydrous alumina gel was 6.25. After spray drying, the pH of the slurry of the alumina with water was 6.25. The physical and chemical properties of the product of this example are summarized in Table II.

EXAMPLE IX

This example again illustrates the marked effect of the pH of the spray dried product on the sodium oxide content of the finally washed product.

In this run, 8 gallons of aluminum sulfate solution was prepared to contain 96.5 grams per liter $Al_2O_3$. The solution was heated to 90° F. and 15.4 gallons or 142.5 pounds of sodium aluminate solution containing 5.18% $Al_2O_3$ and 4.79% $Na_2O$ was added. The pH of this slurry was 4.7. The alumina gel slurry thus formed was mixed 15 minutes, then spray dried without prior filtration. The pH of the spray dried product on reslurrying with water was 4.6. On screen analysis it was found that 61% of the spray dried product had passed through a 200 mesh screen. The spray dried product was washed and flash dried in the same manner described in Examples VII and VIII. The physical and chemical properties of the product are summarized in Table II.

EXAMPLE X

This example demonstrates the effectiveness of the novel process of pH control for sodium oxide removal. It was thus found that the sodium oxide content of the final product could be reduced to 0.033% $Na_2O$ despite the addition of extraneous sodium (as $Na_2SO_4$) to the aluminous slurry. In this case, 35% of the total sodium was added in this manner. This addition of sodium sulfate is advantageous in that it results in increase in the porosity of the final product. The desired result is obtained by adding about 5 to 35% of the sodium content as sodium sulfate.

In this run, 8 gallons of aluminum sulfate solution was prepared to contain 96.5 grams per liter of $Al_2O_3$. This solution was heated to 90° F. and was mixed with 8.3 pounds of sodium sulfate solution containing 43.6% $Na_2O$. To the mixed solution in the equipment described in Example I was then added 141.5 pounds of sodium aluminate solution containing 5.18% $Al_2O_3$ and 4.79% $Na_2O$. The pH of the aluminous gel slurry after the sodium aluminate addition was 4.7. The aluminous gel slurry was mixed 15 minutes then spray dried without prior filtration. The pH of this spray dried product after reslurry with water was 4.6. The spray dried product of this example was washed and flash dried in the same manner as set out in Examples VII, VIII, and IX. The physical and chemical properties of the product are summarized in Table II.

TABLE II

| Product of example | VII | VIII | IX | X |
| --- | --- | --- | --- | --- |
| pH of unwashed spray dried product | 5.6 | 6.25 | 4.6 | 4.6 |
| Chemical analysis of washed product in percent (dry basis): | | | | |
| $Na_2O$ | 0.055 | 0.086 | 0.019 | 0.033 |
| $SO_4$ | 0.40 | 0.84 | 0.97 | 0.97 |
| Surface area (after 3 hrs. at 1,000° F.) in square meters per gram | 383 | 375 | 352 | 327 |
| Pore volume in cubic centimeters per gram: | | | | |
| Nitrogen | 0.88 | 0.85 | 0.80 | 0.83 |
| Mercury | 1.84 | 1.84 | 2.04 | 2.15 |
| Compacted density in pounds per cubic foot | 21.8 | 21.8 | 21.2 | 21.8 |

A comparison of the product obtained from Example VIII with those obtained in Examples VII, IX and X emphasize the criticality of pH control in preparing the alumina gels of our invention. Increasing the pH to 6.25 resulted in an increase in the $Na_2O$ content to 0.086% or more than four times the sodium content of the product of Example IX. A sodium content in this range would be highly undesirable as pointed out previously.

Decrease in the pH to 5.6 resulted in decrease in the $Na_2O$ content from 0.086% to 0.055%. A further decrease to pH 4.6 decreased the $Na_2O$ content to 0.019% and 0.033% respectively.

EXAMPLE XI

Examples XI through XV illustrate the preparation of the alumina by the third embodiment of our invention.

In this run a total of 2,110 gallons of aluminum sulfate solution was heated to a temperature of 90° F. This solution contained 89.4 grams per liter of $Al_2O_3$ and 4.9 grams per liter of free sulfuric acid. A total of 2,800 gallons of sodium carbonate solution containing 8.76% $Na_2O$ was added.

The slurry at this point had a $Na_2O$ to $Al_2O_3$ weight ratio of 1.49 to 1. The final pH of the spray drier feed was 5.6. The sulfuric acid added as excess in the alum was equivalent to 2.3% of the total added $Na_2O$.

This aluminous slurry was spray dried in a commerical spray drying unit. The spray dried product contained 10.5% total volatiles at 1750° F. and had a pH of 4.5. The analysis of the material showed that 96.6% of the product passed through a 270 mesh screen.

The spray dried product was washed with 2 washes of decationized water, 3 washes at 1° Bé., ammonium sulfate solution and 5 washes of decationized water which had been adjusted with ammonia to give a pH of 9.5 to the slurry of ammonia water and alumina gel. The gel was filtered and flash dried. The analysis of the product and the physical properties of the product are set out in the table below:

Product analysis
Chemical:
  $Na_2O$—0.039%
  $SO_4$—1.21%
Properties after heating 3 hours at 1000° F.
Surface area (B.E.T. method) 346 m.²/g.
Nitrogen pore volume (B.E.T. method) 0.66 cc./g.
Mercury pore volume 2.64 cc./g.
Activated compacted density 16.4 pounds/cu. ft.

It is apparent from a review of these data that a product with suitable characteristics can be prepared using a slurry with a $Na_2O$ to $Al_2O_3$ ratio of 1.49 when the final pH of the spray drier feed slurry is about 5.6 and the pH of the spray dried product is not less than 4.5. The mercury and nitrogen pore volume values of this product contained only 0.039% sodium ($Na_2O$) and 1.21% sulfate.

EXAMPLE XII

The criticality of the adjustment of the pH of the spray dried product was demonstrated in a run in which no neutral sodium salt or acid was added to the alum solution.

In this example, sufficient sodium carbonate was added to the alum solution to give a $Na_2O$ to $Al_2O_3$ ratio of 1.68 to 1. No sulfuric acid or sodium sulfate was employed.

A total of 10 gallons of aluminum sulfate solution was prepared to contain 100 grams per liter of $Al_2O_3$. This solution was heated to 90° F. and 16.75 gallons of a 15% sodium carbonate solution was added to bring the pH of the spray drier feed to 7.5. The hydrated aluminous slurry thus formed was spray dried. The spray dried product had a total volatiles analysis of 16.50% and a pH of 8.2. On screen analysis, it was found that 86% of the product passed through 200 mesh screen. The washing and characterization of this product are described in the Table III below.

EXAMPLE XIII

Another run was made in which the $Na_2O$ to $Al_2O_3$ ratio was 1.68 to 1. Prior to addition of soda ash, a 10% solution of sulfuric acid was added to the alum solution. This served to control the pH of the spray dried product.

A total of 10 gallons of aluminum sulfate solution was prepared to contain 100 grams per liter of $Al_2O_3$. This material was heated to 90° F. and 5,640 ml. of 10% sulfuric acid solution was added. The sodium carbonate solution was then added as 16.75 gallons of a 15% solution. The pH of the slurry was 5.7. The aluminous gel slurry thus formed was spray dried. The spray dried product had a total volatiles analysis of 15.1% and a pH of 5.4. On screen analysis of this product 77% of the product passed through a 200 mesh screen. The washing and characterization of this product are set out in Table III below.

EXAMPLE XIV

In this example, the pH of the aluminous gel slurry was maintained at 5.7. This example differs from Examples XI and XII in that the weight ratio of $Na_2O$ to $Al_2O_3$ was reduced to 1.37 to 1. This was acomplished by adding sodium carbonate solution to aluminum sulfate solution in the absence of added sulfuric acid or sodium sulfate.

A total of 10 gallons of aluminum sulfate solution was prepared to contain 100 grams per liter of $Al_2O_3$. The solution was heated to 90° F. A total of 13.7 gallons of a 15% sodium carbonate solution was added. The pH of the slurry at this point was 5.7. The aluminous gel slurry was then spray dried. The spray dried product had a total volatiles analysis of 16.8% and a pH of 5.4. The screen analysis of the product showed that 83% of the material passed through a 200 mesh screen. The washing and characterization of this product are set out in Table III below.

EXAMPLE XV

This example describes the washing of the product of the instant application. Individual 400 gram samples of the products of Examples XII, XIII, and XIV were reslurried in 200 ml. of wash solution which had been previously heated to 120° F. This washing was repeated in each case for a total of 10 washes. The first 4 washes were with 2° Bé. ammonium sulfate solution. The final 6 washes were with ammoniated cationic water which contained no ammonium sulfate. In wash number 5 sufficient ammonia was added to give a pH of 9.5 to the slurry of the spray dried product in decationized water. In washes 6 through 10 ammonia was added to give a pH of 9.0 to 9.2 to the slurry. The wash water was decanted from the catalyst in all washes except wash number 10 where the wash water was separated from the catalyst by filtration. The washed catalysts were then flash dried using thin catalyst beds spread over 15″ x 13″ x ½″ pans placed in an electric oven operated at 400° C. The physical properties and chemical analysis of these products are set out in Table III below.

TABLE III

| Product of example | XII | XIII | XIV |
|---|---|---|---|
| $Na_2O$ to $Al_2O_3$ ratio | 1.68 | 1.68 | 1.37 |
| pH of slurry prior to spray drying | 7.5 | 5.7 | 5.7 |
| pH of spray dried product | 8.2 | 5.4 | 5.4 |
| Chemical analysis in percent: | | | |
| $Na_2O$ | 0.166 | 0.063 | 0.079 |
| $SO_4$ | 1.12 | 1.88 | 4.65 |
| Fe | 0.048 | 0.042 | 0.041 |
| Total volatiles at 1,750° F | 14.37 | 13.47 | 14.52 |
| Physical properties after activation for 3 hours at 1,000° F.: | | | |
| Surface area (B.E.T. method) in m.²/g | 339 | 381 | 301 |
| Pore volume nitrogen (B.E.T. method) in cc./g | 0.91 | 1.03 | 0.80 |
| Compacted density in pounds/cu. ft | 20.5 | 17.4 | 21.5 |

Example XII shows the effect of high pH of the spray drier feed on the final product. The sodium content could not be reduced to the desired level when the spray drier feed had a pH of 7.5. The product after successive washings contained 0.166% $Na_2O$. A product with a $Na_2O$ level in this range would not be satisfactory for use as a catalyst base. The product of Example XIII had the most desirable physical properties in that the pore volume was higher and the density lower than in Examples XII and XIV. This example emphasizes the criticality of the range of reactants and pH of the spray dried product in preparation of the alumina of our invention.

Obviously many modifications and variations of the invention may be made without departing from the essence of the scope thereof and only such limitations should be included as are indicated in the appended claims.

What is claimed is:

1. A process for preparing an alumina gel having a compacted density of 14 to 25 pounds per cubic foot and a mercury pore volume of 1.5 to 3.5 cc./gram after heating at 1000° F. for 3 hours, which comprises:
   (a) preparing an aqueous solution of a soluble aluminum salt selected from the group consisting of aluminum chloride, aluminum nitrate, and aluminum sulfate about 65–100 grams of alumina per liter;
   (b) preparing an aqueous solution of sodium aluminate containing about 65 to 100 grams of alumina per liter;
   (c) combining said aluminum salt solution with said sodium aluminate solution in amounts to provide a precipitated alumina gel slurry which upon spray drying and reslurring of the unwashed precipitate with water will exhibit a pH of 4.5 to (6.0) 7.0;
   (d) spray drying the alumina slurry;
   (e) washing, drying, and recovering the alumina gel product.

2. The process of claim 1 wherein said solutions are combined in step (c) at a temperature of about 90° F.

References Cited

UNITED STATES PATENTS

| | | | |
|---|---|---|---|
| 2,894,898 | 7/1959 | Oettinger et al. | 23—143 X |
| 3,055,737 | 9/1962 | Wilson et al. | 23—143 |
| 3,066,012 | 11/1962 | Wilson et al. | 23—143 |
| 3,151,939 | 10/1964 | Kehl et al. | 23—143 |
| 3,352,636 | 11/1967 | Wilson et al. | 23—143 |
| 3,124,418 | 3/1964 | Malley et al. | 23—143 |

OSCAR R. VERTIZ, Primary Examiner

G. T. OZAKI, Assistant Examiner

U.S. Cl. X.R.

252—463